Oct. 24, 1967    C. B. ISBRANDT    3,348,753
MOLTEN SOLDER DISPENSING DEVICE
Filed April 5, 1965    2 Sheets-Sheet 1
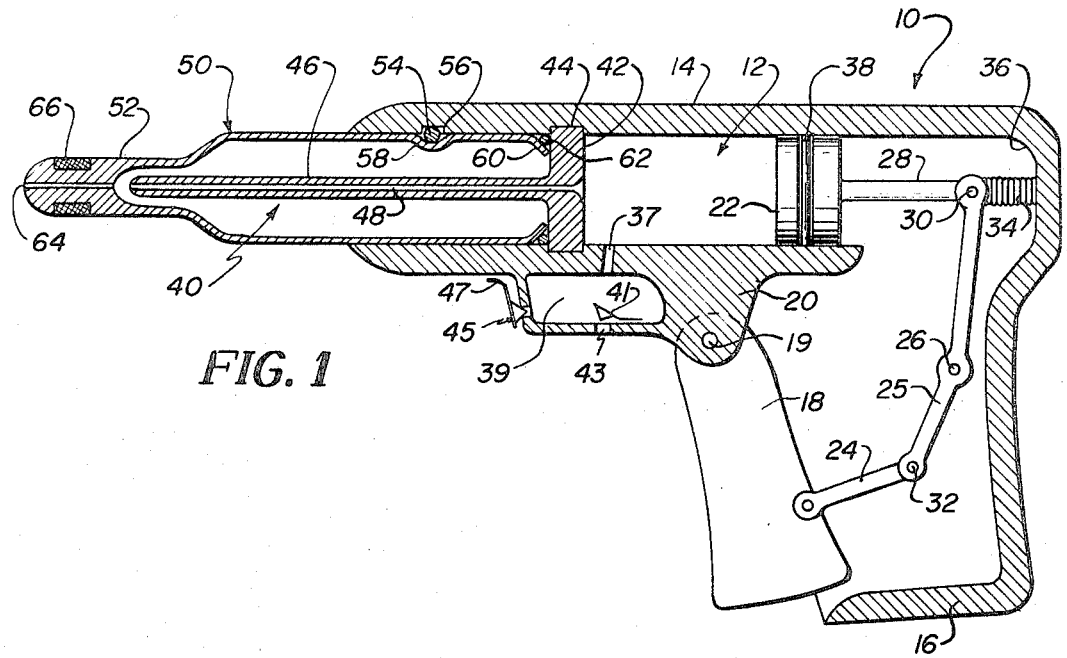
FIG. 1
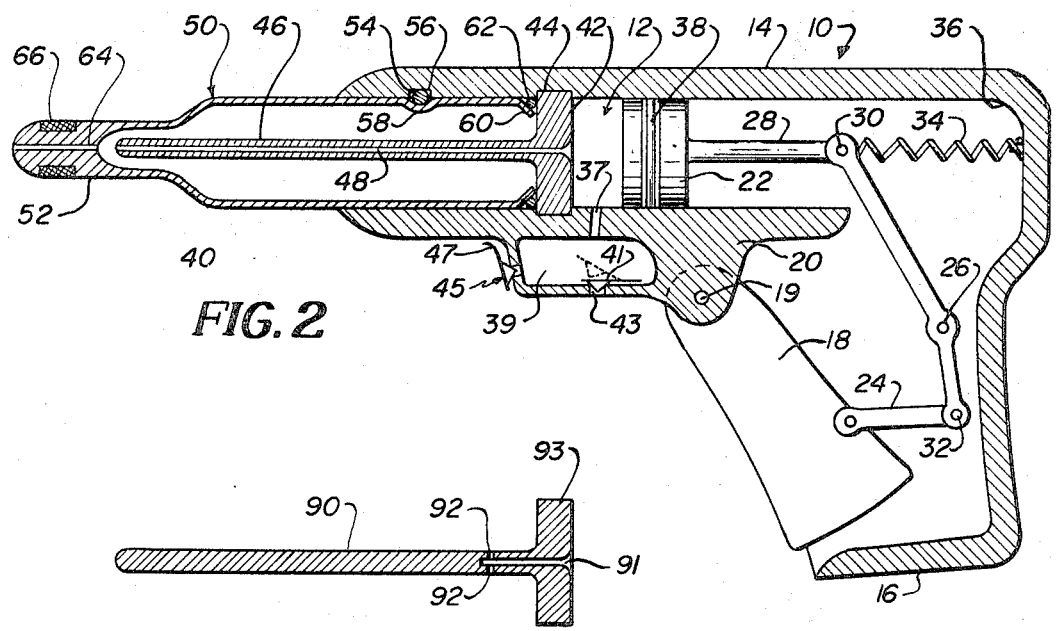
FIG. 2
FIG. 6
INVENTOR
Clarence B. Isbrandt
BY
Dominik and Stein
ATTORNEYS Oct. 24, 1967 C. B. ISBRANDT 3,348,753
MOLTEN SOLDER DISPENSING DEVICE
Filed April 5, 1965 2 Sheets-Sheet 2

INVENTOR
Clarence B. Isbrandt
BY
Dominik and Stein
ATTORNEYS

United States Patent Office 3,348,753
Patented Oct. 24, 1967

3,348,753
MOLTEN SOLDER DISPENSING DEVICE
Clarence B. Isbrandt, 3911 N. Christiana Ave.,
Chicago, Ill. 60618
Filed Apr. 5, 1965, Ser. No. 445,546
10 Claims. (Cl. 228—53)

This invention relates to soldering devices and more particularly to a molten solder dispensing device which is both adapted to dispense, or eject, an amount of heated solder in molten or liquid state sufficient to join together pieces of work, such as electrical wiring and the like and to be used as a conventional soldering gun.

Numerous soldering devices which are adapted to dispense molten solder have been devised, however, each of them has been unsatisfactory, for one reason or another. For example, the available soldering devices generally use a gravity feed system or a plunger type arrangement which slides transversely within the molten solder reservoir, to dispense the molten solder from the reservoir. The type using a gravity feed system usually becomes clogged due to foreign matter entering the exit orifice and the force of gravity generally is not sufficient to clear the orifice so that the flow of solder is restricted, or stopped. The type using a plunger type arrangement is generally unsatisfactory because of the difficulties encountered with the seals and the like, the breakdown of which permits a small amount of solder to leak past the plunger. When this solder solidifies, the operation of the plunger is obstructed.

Also, the solder contained within the reservoirs of the presently available soldering devices is generally heated by means of a heating coil or element which surrounds the reservoir. While this arrangement is satisfactory, full advantage of the heating means is not obtained, as indicated hereinafter, as it is with the soldering device of the present invention.

In addition, the presently available soldering devices of the type described are generally heavy and bulky, and are difficult to manipulate.

It is therefore an object of the present invention to provide a new and improved soldering device which is adapted to dispense, or eject, molten solder from a reservoir.

It is a further object of this invention to provide a new and improved soldering device which is adapted to both dispense, or eject, molten solder from a reservoir and to be used as a conventional soldering device.

It is still another object of this invention to provide a molten solder dispensing device which employs pneumatic pressure to dispense, or eject, an amount of solder from a reservoir. In this respect, it is further contemplated that the device have a safety relief valve to protect its internal mechanism from damage in the event it is activated to dispense solder which is not in a molten or liquid state.

It is still another object of this invention to provide a molten solder dispensing device which is compact in construction and is extremely light in weight. It is also contemplated that the construction of the device is such that it is easily and inexpensively manufactured.

Other objects of the invention will in part be obvious and will in part appear hereinafter.

The above objectives are accomplished with a soldering device which, according to the present invention, generally includes a pistol-shaped device, the barrel of which is in the form of an air cylinder and a molten solder reservoir. The air cylinder is terminated and sealed by a heating element having an elongated tip which extends into the molten solder reservoir. A piston in the air cylinder is activated by a trigger mechanism and forces air into the molten solder reservoir through an orifice formed in the heating element. The orifice, in accordance with a first embodiment of the invention, extends the length of the heating element through its center so as to expel the air near the forward end of the reservoir and, in accordance with a second embodiment, extends outwardly through the side of the heating element so as to expel the air near the rearward end of the reservoir. The reservoir likewise has an orifice formed in its tip and solder is ejected through this orifice, under the influence of the air expelled into the reservoir.

The molten solder reservoir is removably secured to the soldering device and the heating element is formed in such a manner that upon removal of the reservoir, the soldering device, that is, the heating element, can be used as a conventional soldering device.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIGURE 1 is a sectional view taken transversely along the longitudinal center line of a soldering device exemplary of the present invention, illustrating the arrangement of parts before the trigger mechanism is activated;

FIGURE 2 is a sectional view of the soldering device of FIG. 1, illustrating the arrangement of parts after the trigger mechanism is activated;

Figure 5:
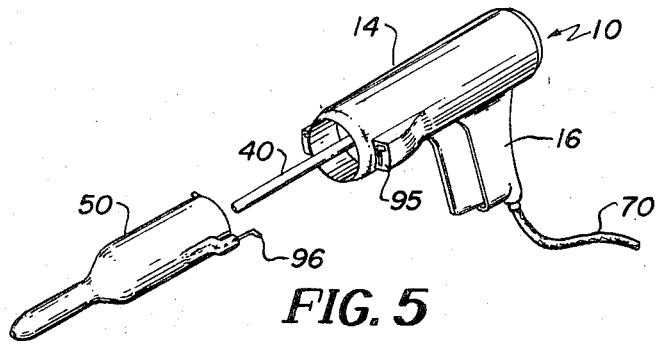

FIGURE 5 is an isometric view illustrating how the molten solder reservoir is removably secured to the soldering device, in accordance with a second embodiment of the invention, and also how the soldering device is used in the conventional manner, with the reservoir removed; and FIGURE 6 is a sectional view of a heating element having an orifice formed therein, in accordance with a second embodiment of the invention.

Similar reference characters refer to similar parts throughout the several views of the drawings.

Referring now to the drawings, in FIG. 1, there is shown a soldering device 10 which is exemplary of the present invention and which is generally pistol-shaped having a hollow cylindrical shaped barrel 14 which is closed at one end and has a grip or handle 16 fixedly secured thereto. A trigger 18 which is substantially the size of the grip 16 is pivotally secured by means of a pivot pin 19 to a depending flange 20 and adapted to be pivoted within the grip 16. A piston 22 is slidably retained within an air cylinder 12 formed within the barrel 14 and is coupled to the trigger 18 by means of link members 24 and 25. The link member 25 is pivotally secured at approximately its mid-section by a pivot pin 26 and is pivotally secured at its one end to a piston shaft 28 by means of a pivot pin 30 and at its other end to the link member 24 by means of the pivot pin 32. A spring 34 is fixedly secured to the rear closed wall 36 of the barrel 14 and to the end of the piston shaft 28 for withdrawing the piston 22 from the air cylinder 12 when the trigger 18 is released, in a manner described more fully hereinafter. The piston 22 also has a seal ring 38 secured within a groove formed about its periphery to prevent leakage of air from the air cylinder 12 when the piston 22 is actuated.

The depending flange 20 has a cavity 39 formed therein, and a relief orifice 37 is formed from the air cylinder 12 into the cavity 39. An air inlet valve 41 is secured within the cavity 39 and is adapted to pivot to open and close an air inlet orifice 43 leading from the cavity 39 to the atmosphere. A safety vent 45 is fixedly secured to the depending flange 20 and has a leaf spring 47 which is adapted to normally prevent air from escaping through it as the piston 22 is forced forward into the air cyclinder 12 and to open to permit air to escape to prevent damage to the trigger mechanism, in a manner described more fully hereinafter.

A heating element 40 has an enlarged circular end portion 42 which is lockingly secured within a groove 44 formed in the interior wall of the barrel 14 and an elongated tip 46 which extends substantially beyond the end of the barrel 14. In accordance with the first embodiment of the invention, an orifice 48 is formed through the center of the heating element 40, from the air cylinder 12 to its tip.

A hollow cylindrical molten solder reservoir 50 having a smaller tip portion 52 is removably secured within the barrel 14 by means of a retaining ring 54 secured within a groove 56 formed in the interior wall of the barrel 14 and engaged with a detent 58 formed in the wall of the reservoir 50. The end 60 of the reservoir 50 is turned inwardly and a sealing ring 62 is secured between the enlarged circular end portion 42 of the heating element 40 and the end 60 of the reservoir 50 to prevent molten solder and air from escaping from the reservoir 50. A dispensing orifice 64 is formed in the tip portion 52 of the reservoir 50 for ejecting solder from the reservoir 50, and a heating element 66 is formed about the tip portion 52 to prevent solder from solidifying in the orifice 64.

In operation, the solder in the reservoir 50 is melted by the heating element 40 and upon actuation of the trigger 18, the link member 25 is forced to pivot about pivot pin 26, which action forces the piston 22 to slide forward within the air cylinder 12, as shown in FIG. 2. Piston 22 forces air from the air cylinder 12, through the orifice 48 formed in the heating element 40 into the molten solder reservoir 50. When sufficient pressure is built up within the reservoir 50, molten solder is forced out of the reservoir, through the dispensing orifice 64 formed in its tip 52. When the desired amount of solder is dispensed, the trigger 18 is released and the spring 34 secured to the piston shaft 28 withdraws the piston 22 from the air cylinder 12, to the position shown in FIG. 1.

As the piston 22 is withdrawn from the air cylinder 12, the air inlet valve 41 opens, due to the suction force created within the air cylinder 12, and permits air to flow into the air cylinder. Air inlet valve 41 therefore prevents solder from being sucked out of the reservoir 50, when the piston 22 is withdrawn from the air cylinder 12.

If the solder within the reservoir 50 is not melted sufficiently to be readily forced through the dispensing orifice 64, the safety vent 45 is forced open by the pressure built up in the air cylinder 12 to allow air to escape to prevent damage to the link members 24 and 25.

The heating element 66 prevents the solder in the dispensing orifice 64 from solidifying so that it will not block the dispensing orifice 64. It may also be noted that heating element 66 also provides heat at the tip 52 for heating the work prior to application of solder.

Figure 3:
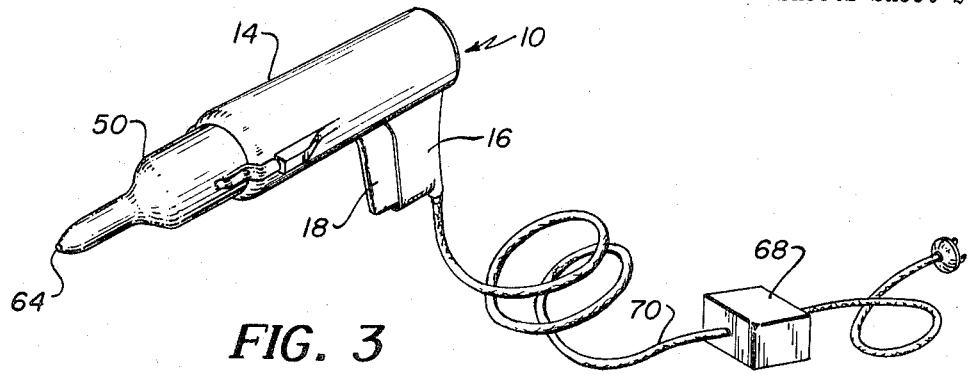
FIGURE 3 is an isometric view of the soldering device of FIG. 1, in its assembled condition.

In FIG. 3, the soldering device 10 is shown in its assembled condition. Power for the soldering device is provided from any standard 110 volt source of power normally found in the home or office, through a transformer 68 coupled in the electrical cord 70 which is connected to the soldering device 10 through the grip 16. Electrical connection is made with the heating element 40 by extending connecting conductors through apertures (not shown) formed in the wall of the barrel 14, and to the heating element 66 by means of conductors connected thereto and to a pair of electrical couplers 72 and 73 (FIG. 4) secured within a pair of offset flanges 74 and 75, respectively, on the opposite sides of the reservoir 50. The electrical couplers 72 and 73 are adapted to be plugged into electrical couplers formed in correspondingly positioned offset flanges (only one flange 76 shown) formed on the barrel 14. With this arrangement, the reservoir 50 can be removed and the connection to the heating element 66 easily disconnected, without having to disconnect terminals or the like. It may also be noted that with the transformer 68 being included in the electrical cord 70 external of the soldering device, a light weight, compact soldering device is provided which can be easily held with one hand and operated.

Figure 4:
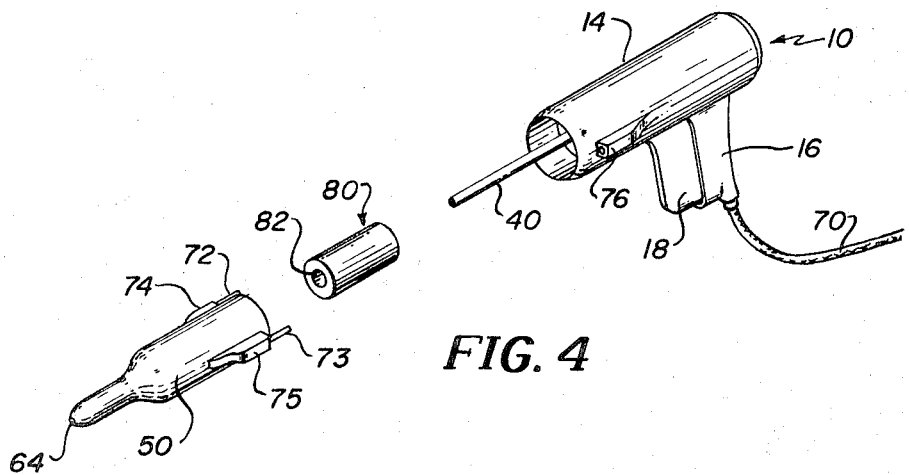
FIGURE 4 is an isometric view illustrating the soldering device of FIG. 1, with the molten solder reservoir removed for refilling, and a solder refill which is advantageously used with it.

The reservoir 50 is easily removed by pulling it outward, away from the barrel 14 to release the retaining ring 54 from the detent 58 formed in its wall. The soldering device 10 with the reservoir removed is shown in FIGS. 4 and 5. It may be noted that with the reservoir 50 removed, the remaining portion of the soldering device can be used as a conventional soldering device, since the heating element 40 is exposed and is energized so that it is heated. By constructing the soldering device in this manner, it actually serves a dual function as a conventional soldering device, with the reservoir 50 removed, and as a molten solder dispensing device, with the reservoir attached.

In FIG. 4 there is also shown a solder refill 80 which is cylindrical in shape and has an aperture 82 formed through its center. The soldering device can be easily refilled by placing the solder refill 80 in the reservoir 50 and by attaching the reservoir to the barrel 14, by engaging the retaining ring 54 with the detent 58. The tip 48 of the heating element 40 is passed through the aperture 82 in the solder refill. It is, of course, apparent that other types of solder refills can be used, such as pellets and the like.

In FIG. 6 there is shown a heating element 90 which is substantially the same as the heating element 66, but an orifice 91 is extended only part way through its center and an orifice 92 which perpendicularly intersects the orifice 91 is formed therein, near the enlarged base portion 93. With this arrangement, the air from the air cylinder 12 is expelled near the rear of the reservoir 50, rather than near its tip portion 52. This type of arrangement is advantageously used with solders which may have a high viscosity, to prevent a channeling effect which would expel air directly from the end of the tip 46 of the heating element out through the dispensing orifice 64, without dispensing any substantial quantity of color.

In FIG. 5, the offset flanges on the barrel 14 are enlarged and have an electrical coupler in the shape of a key slot, such as the key slot 95, formed therein. The electrical connectors, such as 96, on the offset flanges on the reservoir are correspondingly shaped and adapted to be lockingly received within the key slots in the flanges on the barrel 14. This arrangement complements the operation of the retaining ring 54 and the detent 58 in securing the reservoir 50 to the soldering device.

It will be seen that the objects set forth above, among those made apparent from the preceding description, are efficiently attained and, since certain changes may be made in the above construction without departing from the scope of the invention, it is intended that all matter contained in the above decription or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A soldering device comprising (a) an air chamber; (b) a piston within said air chamber adapted to expel air from said air chamber; (c) actuating means coupled to said piston for operating said piston to expel air from said air chamber; (d) heating means having an enlarged base portion and an elongated tip portion, said tip portion having an orifice formed therein and said base portion being secured within said air chamber, said orifice in said tip portion communicating with said air chamber so that air expelled from said air chamber is forced through said orifice; and (e) reservoir means formed about said heating means for holding a supply of solder, said reservoir means having a dispensing orifice formed therein, said solder being expelled from said reservoir through said dispensing orifice when said actuating means is operated.

2. A soldering device comprising (a) an air chamber; (b) a piston within said air chamber adapted to expel air from said air chamber; (c) actuating means coupled to said piston for operating said piston to expel air from said air chamber; (d) heating means having an enlarged base portion and an elongated tip portion, said tip portion having an orifice formed therein and said base portion being secured within said air chamber, said orifice in said tip portion communicating with said air chamber so that air expelled from said air chamber is forced through said orifice; and (e) reservoir means removably secured within said air chamber and formed about said heating means for holding a supply of solder, said reservoir means having a dispensing orifice formed therein, said solder being expelled from said reservoir through said dispensing orifice when said actuating means is operated, said reservoir means being removable whereby said tip portion of said heating means is usable to solder work pieces in substantially the same fashion as a conventional soldering device.

3. A soldering device comprising (a) an air chamber; (b) a piston within said air chamber adapted to expel air from said air chamber; (c) actuating means coupled to said piston for operating said piston to expel air from said air chamber; (d) heating means having an enlarged base portion and an elongated tip portion, said tip portion having an orifice formed therein and said base portion being secured within said air chamber, said orifice in said tip portion communicating with said air chamber so that air expelled from said air chamber is forced through said orifice; a transformer for supplying power to said heating means, said transformer being externally positioned from said soldering device and included in a line coupling said soldering device to a source of power; and (e) reservoir means formed about said heating means for holding a supply of solder, said reservoir means having a dispensing orifice formed therein, said solder being expelled from said reservoir through said dispensing orifice when said actuating means is operated.

4. A soldering device comprising (a) an air chamber; (b) a piston within said air chamber adapted to expel air from said air chamber; (c) actuating means coupled to said piston for operating said piston to expel air from said air chamber; (d) heating means having an enlarged base portion and an elongated tip portion, said tip portion having an orifice formed therein and said base portion being secured within said air chamber, said orifice in said tip portion communicating with said air chamber so that air expelled from said air chamber is forced through said orifice; a transformer for supplying power to said heating means, said transformer being externally positioned from said soldering device and included in a line coupling said soldering device to a source of power; and (e) reservoir means removably secured within said air chamber and formed about said heating means for holding a supply of solder, said reservoir means having a dispensing orifice formed therein, said solder being expelled from said reservoir through said dispensing orifice when said actuating means is operated, said reservoir means being removable whereby said tip portion of said heating means is usable to solder work pieces in substantially the same fashion as a conventional soldering device.

5. A soldering device comprising (a) an air chamber; (b) a piston within said air chamber adapted to expel air from said air chamber; (c) trigger means pivotally supported from said air chamber; link means coupling said trigger means to said piston for operating said piston to expel air from said air chamber when said trigger means is operated; (d) a heating element having an enlarged base position and an elongated tip portion, said heating element having an orifice formed therein and said base portion being secured within said air chamber, said orifice in said heating element communicating with said air chamber so that air expelled from said air chamber is forced through said orifice; and (e) reservoir means removably secured within said air chamber and formed about said heating element for holding a supply of solder, said reservoir means having a dispensing orifice formed therein, said solder being expelled from said reservoir through said dispensing orifice when said trigger means is operated.

6. A soldering device comprising (a) an air chamber; (b) a piston within said air chamber adapted to expel air from said air chamber; (c) actuating means coupled to said piston for operating said piston to expel air from said air chamber; (d) heating means having an enlarged base portion and an elongated tip portion for melting solder to a molten or liquid state, said tip portion having an orifice formed therein and said base portion being secured within said air chamber, said orifice in said tip portion communicating with said air chamber so that air expelled from said air chamber is forced through said orifice; (e) reservoir means formed about said heating means for holding a supply of solder, said reservoir means having a dispensing orifice formed therein, said molten solder being expelled from said reservoir through said dispensing orifice when said actuating means is operated; air orifice extending from said air chamber; and relief valve means normally closing said orifice to prevent air from escaping from said air chamber, said relief valve means being adapted to permit air to escape from said air chamber when said solder is not in a molten or liquid state.

7. A soldering device comprising a cylindrical shaped barrel forming an air chamber; a pistol-shaped grip extending from said barrel; a piston within said air chamber adapted to expel air from said air chamber; trigger means pivotally secured to said barrel and received with said grip; link means coupling said trigger means to said piston for operating said piston to expel air from said air chamber; (d) heating means having an enlarged base portion and an elongated tip portion, said heating means having an orifice formed therein extending through said base portion and said tip portion, said base portion being secured within said air chamber so that air expelled from said air chamber is forced through said orifice; (e) reservoir means removably secured to said barrel and formed about said heating means for holding a supply of solder, said reservoir means having a dispensing orifice formed therein, said solder being expelled from said reservoir through said dispensing orifice when said trigger means is operated, a heating element formed about said dispensing orifice; said reservoir means being removable whereby said tip portion of said heating means is usable to solder work pieces in substantially the same fashion as a conventional soldering device.

8. A soldering device, as claimed in claim 7, wherein said reservoir means includes connecting pins coupled to said heating element formed about said dispensing orifice for supply power thereto and said barrel has correspondingly positioned pin receiving apertures having a source of power coupled thereto for extending power to said connecting pins.

9. A soldering device, as claimed in claim 8, including a transformer for supplying power to said heating means, said transformer being externally positioned from said soldering device and included in a line coupling said soldering device to a source of power.

10. In combination, a soldering device comprising (a) an air chamber; (b) a piston within said air chamber adapted to expel air from said air chamber; (c) actuating means coupled to said piston for operating said piston to expel air from said air chamber; (d) heating means having an enlarged base portion and an elongated tip portion, said tip portion having an orifice formed therein and said base portion being secured within said air chamber, said orifice in said tip portion communicating with said air chamber so that air expelled from said air chamber is forced through said orifice; (e) reservoir means formed about said heating means for holding a supply of solder, said reservoir means having a dispensing orifice formed therein, said solder being expelled from said reservoir through said dispensing orifice when said actuating means is operated; and a cylindrical-shaped supply of solder having a central aperture formed therein and of such size that it is receivable in said reservoir and said tip portion is receivable in said central aperture.

References Cited

UNITED STATES PATENTS

| | | | |
|---|---|---|---|
| 2,452,360 | 10/1948 | Dunham | 228—53 |
| 2,538,474 | 1/1951 | Schiffleger | 228—53 |
| 3,195,794 | 7/1965 | Baehr et al. | 228—53 |

JOHN F. CAMPBELL, *Primary Examiner.*

M. L. FAIGUS, *Assistant Examiner.*